Dec. 31, 1957    S. W. WHEELER    2,817,899
PRUNING SAW
Filed Sept. 26, 1956
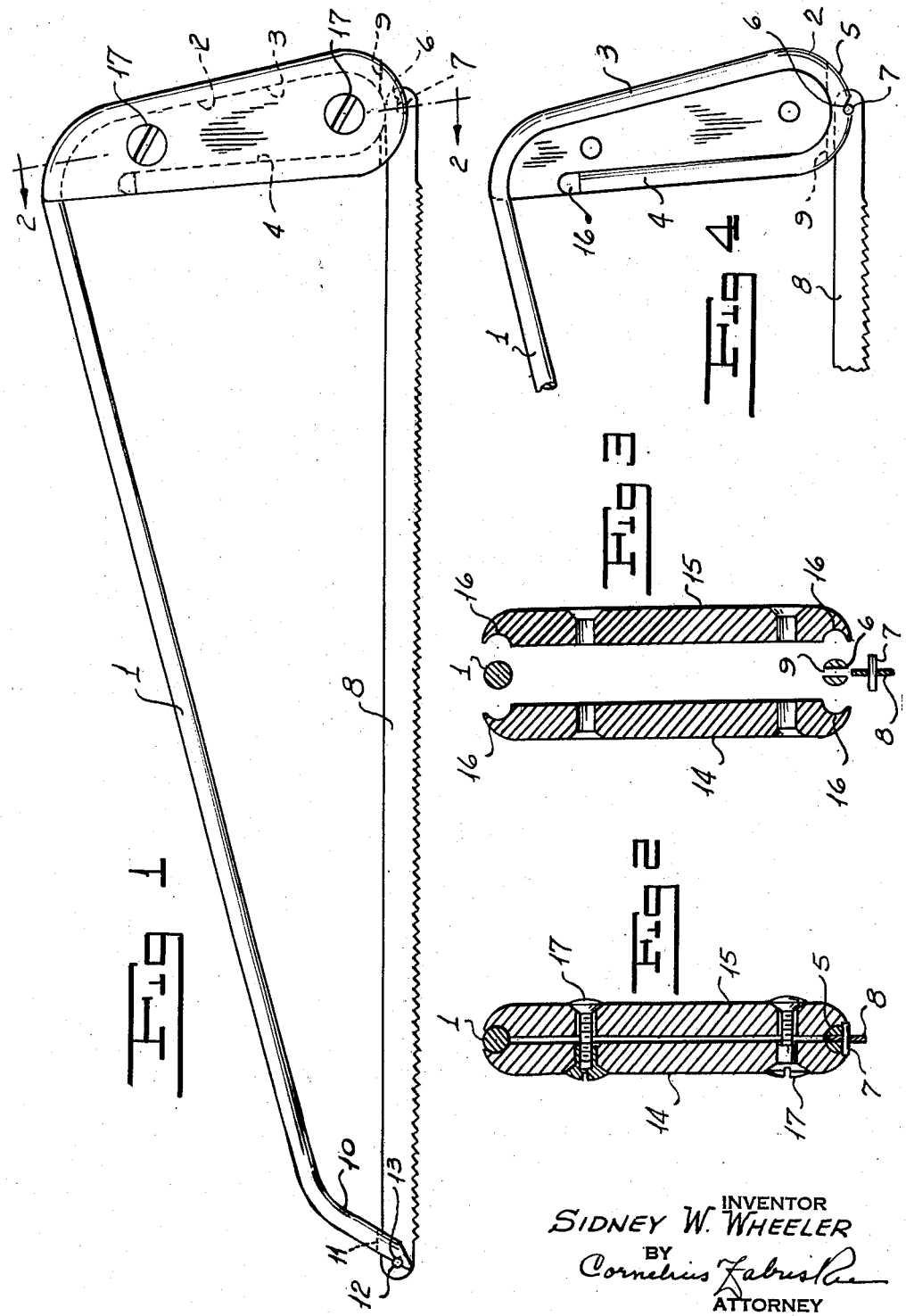
INVENTOR
SIDNEY W. WHEELER
BY
Cornelius Fabres
ATTORNEY

United States Patent Office 2,817,899
Patented Dec. 31, 1957

2,817,899
PRUNING SAW

Sidney W. Wheeler, Belchertown, Mass.

Application September 26, 1956, Serial No. 612,232

2 Claims. (Cl. 30—166)

This invention is a saw primarily intended for use in the pruning of trees and shrubs. A great variety of saws for this purpose are on the market and practically all of them are made with a relatively rigid blade provided at one end with a handle and wholly unsupported at the other end. Even when such a saw is used with extreme care the blade is apt to bend and become practically useless after one or relatively few uses.

The object of the present invention is to provide a relatively cheap, but highly serviceable and durable saw, for the purposes described, which may be satisfactorily used by even the most uninitiated without special care and without damaging it in any way.

The saw of this invention comprises a toothed blade pierced at its opposite ends by anchoring pins adapted to be detachably engaged with notches in the opposite ends of a metal frame of novel constructions. This frame supports the blade at both ends and holds it under longitudinal tension so that it cannot bend. When the blade becomes dull, a new one may be readily substituted therefor by merely springing the frame to disengage the pins of one blade and engage the pins of another blade.

In order to keep the cost of the saw well within the reach of all home owners a very novel, simple and inexpensive handle construction is employed, the details of which will be hereinafter more fully explained, and the frame to which the handle is attached is a one piece construction which may be economically manufactured through the use of appropriate jigs and to which the handle may be attached in a simple and convenient manner.

Features of the invention, other than those adverted to, will be apparent from the hereinafter detailed description and appended claims, when read in conjunction with the accompanying drawings.

The accompanying drawing illustrates one practical embodiment of the invention, but the construction therein shown is to be understood as illustrative, only, and not as defining the limits of the invention.

Fig. 1 is a side elevation of a saw embodying the present invention.

Fig. 2 is a section on the line 2—2 of Fig. 1.

Fig. 3 is a view similar to Fig. 2, but shows the parts supported so that their individual constructions may be more clearly understood.

Fig. 4 is a fragmentary view of the handle end of the saw with one lateral half of the handle removed.

The saw shown in the drawings comprises a frame 1, preferably made of high grade spring steel rod of circular cross section and relatively stiff. It must be resilient enough to permit the blade to be manually engaged and disengaged therefrom but sufficiently rigid to preclude inadvertent release of the blade when the saw is in use.

One end of the rod from which the frame is formed, is returned upon itself to form a fairly close loop 2 having substantially straight sides 3 and 4 with an intermediate bend 5. The bottom of the loop is notched at 6 to engage with a pin 7 extending through one end of the blade 8 and is slotted as at 9 (Fig. 3), so as to receive the handle end of such blade. The blade extends into this slot with the laterally projecting portions of the pin 7 engaging with the undercut notch 6 so as to firmly anchor that end of the blade to the handle.

The other end of the frame extends downwardly, as shown at 10, and is slotted at 11 so that the forward end of the blade may extend therethrough. Said forward end of the blade carries a pin 12, similar to the pin 7, and the opposite ends of this pin are detachably engaged with a notch 13 near the corresponding end of the frame. The blade is thus supported at both ends and is placed under tension by springing the frame sufficiently to engage the pins 7 and 12 with the notches 6 and 13 respectively.

By this arrangement, I am able to employ a relatively narrow blade of first class material, properly set and hardened, without unduly increasing the cost of the saw. Ordinarily one or more additional blades are sold with each saw and may be substituted for the one in place in the frame from time to time as they become dull or break.

The handle for the saw is formed in two sections 14 and 15 which are identical with one another except that they are made right and left. These sections are peripherally shaped to correspond to the peripheral shape of the loop 2 and are routed about their margins to provide channels 16 of substantially semi-circular cross section of a size to receive the lateral halves of the loop, as shown in Fig. 2. When the two sections are assembled from the opposite sides of the loop, the loop will seat within the routed channels 16 and may be firmly clamped between them when said sections are drawn together. This is accomplished by means of the bolts shown in Figs. 1 and 2. The heads of both the screw and nut portion of the bolt are counter-sunk into the opposite faces of the respective sections, so as to provide smooth exterior hand engaging surfaces. When these bolts are drawn up tightly, the loop is rigidly clamped between the handle sections and a thoroughly efficient and comfortable handle is thereby provided.

With handle sections so constituted they may be assembled with respect to the loop 2 expeditiously by unskilled labor. In practice I preferably form the upper portion of the loop so that the spacing at such upper portion is a little closer than the spacing between the corresponding portions of the channels 16. The advantage of this is that, when the handle sections are drawn tightly into place by the bolts 17, the upper portion of the loop is placed under slight tension in a direction longitudinally of the frame and this serves to render more rigid the connection between the handle and the frame when the assembly is completed.

The handle sections may be formed from wood, plastic or any other suitable material and are preferably of such weight as to impart a nice balance to the saw as a whole.

The foregoing detailed description sets forth the invention in its preferred practical form, but the invention is to be understood as fully commensurate with the appended claims.

Having thus fully described the invention, what I claim as new and desire to secure by Letters Patent is:

1. A saw comprising: a bowed metal rod frame, one end of which is slotted and provided with a notch, and the other end of which is formed with a loop, the base of which is also slotted and notched, a relatively narrow saw blade the opposite end portions of which extend into said slots and are provided with laterally projecting pins engaging with said notches with the frame under bowed tension, said frame being much higher at the looped end thereof than at its opposite end to permit the latter end of the saw to be introduced between closely spaced parts of trees or shrubs, and a handle having two separate sections arranged at opposite sides of the loop, the inner faces of said handle sections being channeled to receive, respectively, substantially one lateral half of the loop, and bolts passing through said sections to clamp them to the loop.

2. A saw as in claim 1, wherein the blade receiving slots are arranged in the longitudinal medial plane of the frame.

References Cited in the file of this patent

UNITED STATES PATENTS

| | | |
|---|---|---|
| 999,617 | Wood | Aug. 1, 1911 |
| 1,040,832 | Wood | Oct. 8, 1912 |
| 1,840,925 | Welch | Jan. 12, 1932 |
| 2,014,722 | Damon | Sept. 17, 1935 |